J. P. DOVEL.
GAS WASHER.
APPLICATION FILED OCT. 2, 1908.

1,001,739.

Patented Aug. 29, 1911.

2 SHEETS—SHEET 1.

Witnesses
Edwin L. Bradford
Ralph Wormelle

Inventor
James P. Dovel

By
Rob⸺ D. Johnston, Jr.
Attorney

J. P. DOVEL.
GAS WASHER.
APPLICATION FILED OCT. 2, 1908.
1,001,739.
Patented Aug. 29, 1911.
2 SHEETS—SHEET 2.
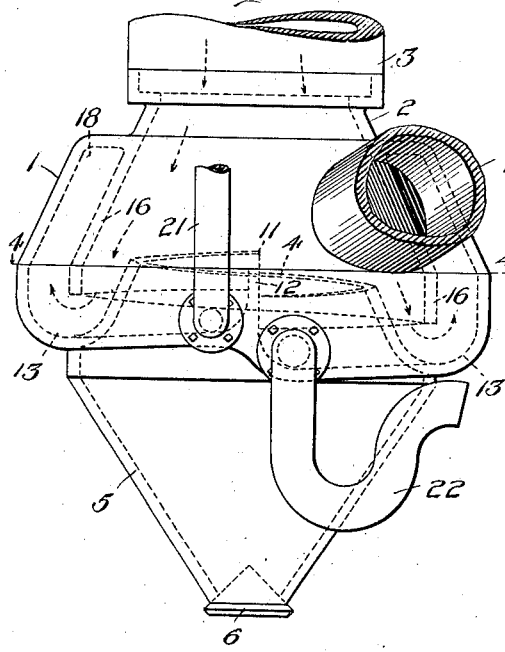
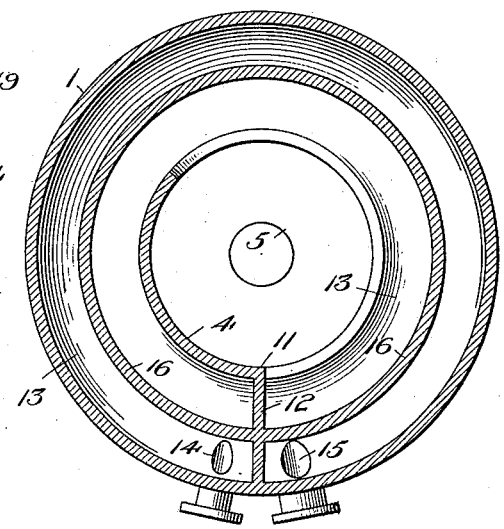
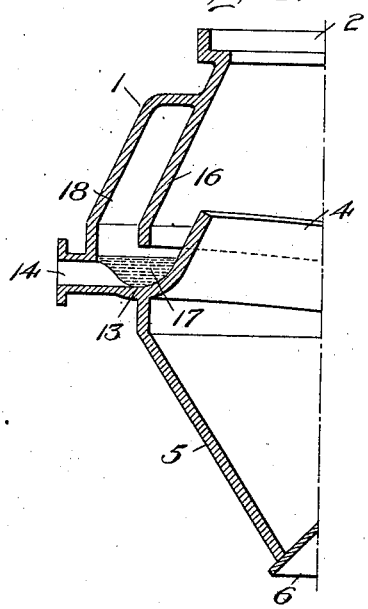
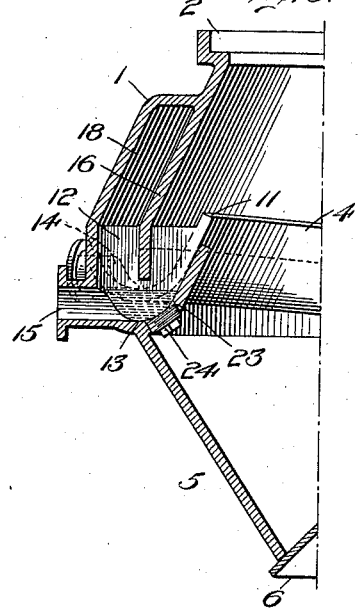
Witnesses
Edwin L. Bradford
Ralph Wormelle
Inventor
James P. Dovel
By
Rutter Johnston Jr.
Attorney

UNITED STATES PATENT OFFICE.

JAMES PICKERING DOVEL, OF BIRMINGHAM, ALABAMA, ASSIGNOR OF ONE-THIRD TO JOHN J. SHANNON, OF BIRMINGHAM, ALABAMA.

GAS-WASHER.

1,001,739.  Specification of Letters Patent.  Patented Aug. 29, 1911.

Application filed October 2, 1908. Serial No. 455,839.

*To all whom it may concern:*

Be it known that I, JAMES P. DOVEL, a citizen of the United States, residing at Birmingham, in the county of Jefferson and State of Alabama, have invented new and useful Improvements in Gas-Washers, of which the following is a specification.

My invention relates to an improvement in mechanism for cleaning and purifying gases, particularly blast furnace gases, and has for its object to provide a compact device which will act both as a dry and wet separator, thereby insuring the complete removal of all impurities.

A further object of my invention is to provide for the purification of the gases with the use of a minimum quantity of water, my improved separator acting on the principle of a dry separator to remove the major portion of the foreign matter from the gas so that the water purifying portion of the apparatus is called upon to act only on the gases from which a large percentage of impurities has been removed.

In functioning as a wet separator, my present invention acts upon the principle disclosed and claimed in my pending application Serial No. 445,414, filed July 25th, 1908, which principle is based upon the utilization of a shallow flowing stream against which the gases impinge as they are deflected and which stream acts to carry out with it the impurities which it collects from the gases.

A further object of my invention is to greatly increase the compactness of such purifying apparatus by providing a circular casing subdivided by an annular partition to form two chambers which have communication through an annular clearance between such partition and the water in a trough which surrounds a dry hopper, which compact structure is of particular advantage for use in connection with ovens, while the elongated construction described in my pending application above mentioned, is better adapted for use in connection with boilers.

My invention further consists in the details of construction and arrangement of parts hereinafter more fully described and claimed, reference being had to the accompanying drawings, in which:—

Figure 1:
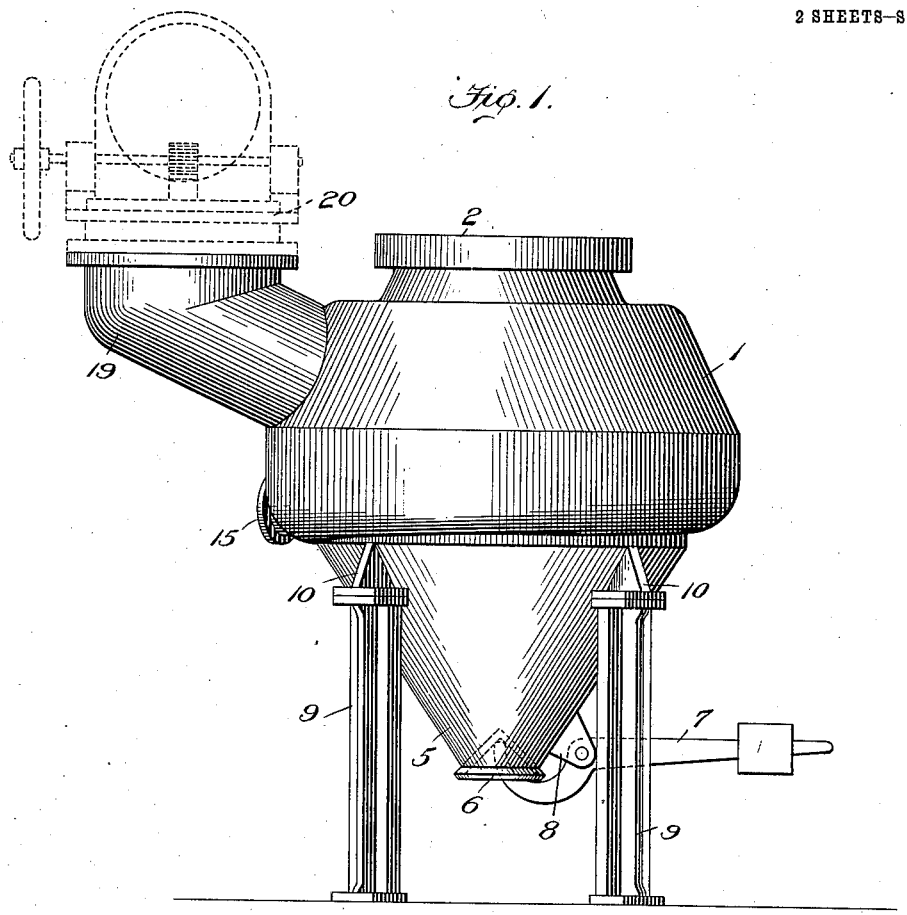
Figure 2:
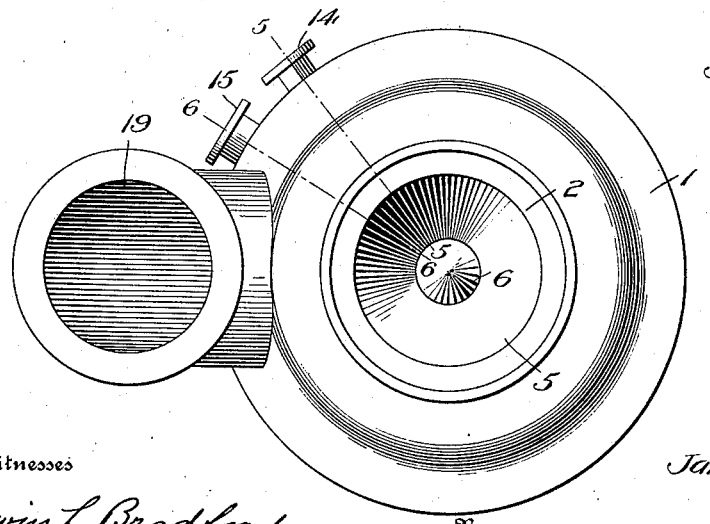

Figure 1 is a side elevation of my improved gas washing apparatus. Fig. 2 is a top plan view of Fig. 1. Fig. 3 is a side elevation of the internal arrangement of partitions shown in dotted lines. Fig. 4 is a cross-sectional view taken along the lines 4—4 of Fig. 3. Figs. 5 and 6 are partial vertical sectional views taken along the lines 5—5 and 5—5 of Fig. 2.

Similar reference numerals refer to similar parts throughout the drawings.

As illustrated, my invention comprises an annular metallic casing 1 which may be formed integrally or in parts suitably secured together. The gases to be purified enter the casing 1 through the port 2 arranged in the center of the top portion thereof which is shown tapering. The gases enter through a pipe 3, as seen in Fig. 3, and the heavier particles of foreign matter, entering with the gases, tend to fall through the circular opening left by the internal partition wall 4 into an inclined hopper 5 forming the bottom portion of the casing and closed by a clean out bell 6 suitably mounted upon a weighted lever 7 pivoted between the lugs 8 integral with the casing. As thus described the casing will function as a dry dust catcher. The casing 1 is mounted upon supports 9 suitably fastened to projections 10 on the hopper. The inner edge of the annular partition wall 4, beginning at the point 11, which is opposite the radial partition 12, slopes gradually and uniformly until it has completed the circle and arrives at the partition 11 again. This slope of the partition is carried out in the annular trough 13 which is formed thereby. Beginning on one side of the partition 12 opposite the water inlet port 14, this trough 13 slopes gradually until it reaches the opposite side of the partition where the outlet port 15 for the water is disposed. The vertical partition 12 separates the abutting ends of the trough and causes the water admitted through the port 14 to flow circumferentially around the casing and out through the port 15. I provide an annular depending partition 16 which overhangs the trough 13, the lower edge of this partition being so disposed as to preserve a uniform distance from the bottom of the trough and accordingly a uniform clearance above the body of flowing water 17 in the trough. This partition 16 is spaced equi-distantly from the outer wall of the casing, leaving an annular chamber 18 into which the purified gases flow and from which the outlet pipe 19 leads. From the pipe 19 the purified gases flow under the control of any suitable valving apparatus 20 to the ovens, hot blast stoves, or other points of use. No valve apparatus will be needed when used for boilers, the seal being much better than the valves now in use.

In operation, a small stream of water flows through the supply pipe 21 and through port 14 into the trough 13, and flowing continuously in a stream around the same is drawn out through the port 15 and the pivoted adjustable goose-neck 22 which, as seen in Fig. 3, is coupled to the outer end of the port 15 and when desired may be tilted upwardly until the water level in the trough is brought up nearly to the top of partition 4, thus effectively sealing the gas purifier without the use of a mechanical valve. The gases to be purified, as they flow down in a straight line through the pipe 3 into the casing, tend to deposit all of the larger and heavier particles or impurities directly into the hopper 5, the apparatus to this extent acting in the same manner as many of the dry separators or dust catchers now in use. The gases thus partially purified are then diverted over the edge of the partition 4 and pass downwardly in a thin sheet through an annular clearance formed between the bottom edge of the partition 16 and the water 17 in the trough. As the gases in a thin sheet pass under the partition they will impinge against the flowing body of water in the trough, which water, due to the action of the gases thereon (which gases flow at substantially right angles to the direction of flow of the water), will be forced outwardly against the outer inclined side wall of the trough so as to form an inclined shallow stream against which the gases in a thin sheet impinge. By reason of the speed of flow of the gas and the sharp turn it makes in rounding the baffle, the foreign matter in the gas will be thrown by centrifugal force into the outer surface of the thin sheet of gas so that this surface with the impurities concentrated therein is swept with surface contact only over the water and the gases thereby most effectively cleaned. The flowing stream of water will act to carry out the impurities collected from the gases and discharge them through the outlet port 15. After being thus purified by both dry and wet processes, the gases enter the chamber 18 completely purified and ready for use. It will be noted that the water, flowing in a direction substantially at right angles to the flow of the gases, will have a tendency to act as a liquid brush producing a friction with the flowing gases which is most effective in purifying the latter. With the use of my apparatus a very small stream of water can be effectively utilized to purify a large volume of gas, since it will be evident that the greater percentage of the impurities are discharged into the hopper and do not have to be taken care of in the flowing body of water. Where my apparatus is used in connection with stoves, this body of purified water may be piped from the hot blast bath. In cases, however, where the question of economy in water is of small moment, an opening 23 (Fig. 6), may be tapped into the bottom of the trough and the water permitted to flow into the hopper. I show a plug 24 closing this opening.

My purifying apparatus as above described, on account of its compact character and cheapness of construction, will prove of particular service in connection with blast furnace plants, one of the purifiers being used for each battery of boilers or to each stove and preferably disposed adjacent thereto, which can readily be done without disturbing the gas conduits otherwise than to connect up the purifier with the pipe leading from the gas sewer to that particular battery of boilers or engines.

Where my invention is used in connection with boilers no valves, such as 20, need be used, the water seal being much more effective than the valves in view of the fact that the latter are only used occasionally when necessary to close down a battery for repairs and, being constantly exposed to heat, they seldom operate as a perfect seal or shut off and therefore make it dangerous for workingmen to enter the furnaces unless extra valves or temporary seals be employed.

In referring to the trough as surrounding the casing, I do not desire to be limited either to a cylindrical form for the separator or to the trough extending entirely around a casing of any design, as such matters may be variously modified to meet different conditions within the spirit of my invention.

Having thus described my invention, what I claim as new and desire to secure by Letters Patent, is:—

1. A gas purifying apparatus comprising a separating chamber having an inlet port at the top and a hopper at the bottom and which is surrounded by a water trough which is internally disposed and a partition in said chamber which overhangs said trough and divides the said chamber into two compartments, and means to flow a continuous stream of water through said trough, substantially as described.

2. A purifying apparatus for gases comprising a casing, a gas inlet port at one end thereof, a hopper at the other end, and at an intermediate point an internal trough extending around the casing, and disposed so as to leave a direct passage from inlet port to hopper, a partition in the upper end of the casing which forms an inner and an outer chamber and which overhangs said trough, said outlet chamber having a gas outlet port, and means to circulate water through said trough, leaving a clearance between the water and said partition, as and for the purposes described.

3. An apparatus for purifying gases comprising a hopper, a trough surrounding the upper end of the hopper and a casing superimposed above the trough, means to circulate water through said trough, and a partition in said casing disposed above said trough, said casing having gas inlet and outlet ports arranged on opposite sides of said partition, said inlet port being disposed in the top of the casing and said hopper being disposed under said inlet port, and all the other parts being so arranged as to leave a clear passage between the inlet port and hopper, as and for the purposes described.

4. A gas purifying apparatus comprising a hopper, an annular inclined trough disposed at the upper end of said hopper, a casing above said hopper and inclosing said trough and which is subdivided into compartments by an annular partition which overhangs said trough, said casing having a gas inlet port arranged substantially centrally above the hopper and trough, and means to circulate water through said trough, the lower end of said partition maintaining a uniform clearance above the normal water level in said trough, substantially as described.

5. A gas purifying apparatus comprising an annular casing having a gas inlet port at one end, a hopper at the other end, an inclined trough, near the upper end of the hopper, which extends around the casing, water inlet and outlet ports for said trough, and a partition formed in the upper portion of the casing which projects down into the trough, leaving a substantially uniform clearance between its lower edge and the normal water level in said trough and subdividing the upper portion of the casing into two chambers, said casing having a gas outlet port leading from the outer chamber.

6. A purifying apparatus for gas comprising a casing having at opposite ends an inlet port for the gas and a hopper, and having at an intermediate point a trough which is disposed within the casing, a partition dividing the upper portion of the casing into an inner and outer chamber and which overhangs the trough, said casing having a gas outlet port leading from the outer chamber, a water inlet port for said trough, a water outlet port for said trough, and an adjustable water sealing device connected with said outlet port and operating substantially as and for the purposes described.

7. A gas purifying apparatus consisting of an annular elongated casing having its greatest diameter at the middle portion thereof, the lower end forming a hopper, the upper end having a centrally disposed gas inlet port, an annular downwardly disposed partition, an internal trough arranged near the center of the casing so as to overhang the hopper and the inner wall of which forms a transverse partition in the casing which leaves an opening to the hopper opposite the inlet port for the gases, a radial partition in said trough which latter slopes gradually from one side of said partition until it reaches the other side of the partition, water inlet and outlet ports for said trough on opposite sides of said radial partition in said trough, the lower edge of said downwardly disposed partition being disposed so as to maintain a uniform clearance from the bottom of the trough, and an outlet port for the purified gases leading from the chamber formed between the outer wall of the casing and said partition, substantially as described.

8. An apparatus for purifying gases comprising a casing having a gas inlet port, a partition dividing the casing into gas inlet and outlet chambers, a hopper at the bottom of the inlet chamber, a trough in said casing which underhangs said partition and separates said outlet chamber from said hopper and means to cause a stream of water to flow continuously along said trough under said partition leaving a clearance through which the gas flows across said stream of water into said outlet chamber which is provided with a gas discharge port.

9. A gas purifying apparatus comprising a casing, an internally disposed water trough which extends around said casing at an intermediate point, a partition which co-acts with said trough to subdivide one portion of the casing into two chambers, one having a gas inlet port and the other a gas outlet port, means to circulate a continuously flowing shallow stream of water through said conduit, and means to utilize said water to cut off communication between said chambers, substantially as described.

10. A gas purifying apparatus comprising a casing having a gas inlet at its upper end, a hopper at its lower end and at an intermediate point a water receptacle and a baffle wall which, together with the outer wall of the casing, form an outlet compartment for the purified gases, said parts being so positioned as to cause the gases to flow with a sharp turn around the baffle, and a body of water in the receptacle which leaves a clearance between its normal surface and baffle and over which said gases sweep, as and for the purposes described.

11. A gas purifying apparatus comprising a casing having a hopper in its bottom and having an inlet port for the gases to be purified disposed centrally above said hopper, a water receptacle disposed at an intermediate point in the casing and out of line between the inlet port and hopper, a purified gas chamber formed by a partition in the casing which overhangs said receptacle, means to clean the hopper, and means to supply water to said receptacle, said purified gas chamber having an outlet for the purified gases, substantially as described.

12. A gas purifying apparatus comprising a casing, the upper portion of which is divided by a partition into two compartments, the inner compartment having a gas inlet port and the outer compartment a gas outlet port, a hopper at the lower end of the casing, and means to flow a stream of water below said partition, said means preventing the entrance of gases to the outer compartment except by passing between the partition and said flowing body of water, substantially as described.

13. In a separator, a casing to the center of which the gases to be purified are admitted through a suitable port, a spiral trough surrounding the casing, a baffle overhanging the trough and causing the gases as they flow radially outwardly to be deflected toward said trough, means to admit a stream of water which enters said trough and as it flows along same is impinged upon by the deflected gases, a trap through which said stream of water passes out form the casing, and an outlet pipe for the purified gases.

In testimony whereof I have hereunto set my hand in presence of two subscribing witnesses.

JAMES PICKERING DOVEL.

Witnesses:
NOMIE WELSH,
ANNIE L. PEACE.

---

Copies of this patent may be obtained for five cents each, by addressing the "Commissioner of Patents, Washington, D. C."

---